Patented July 21, 1925.

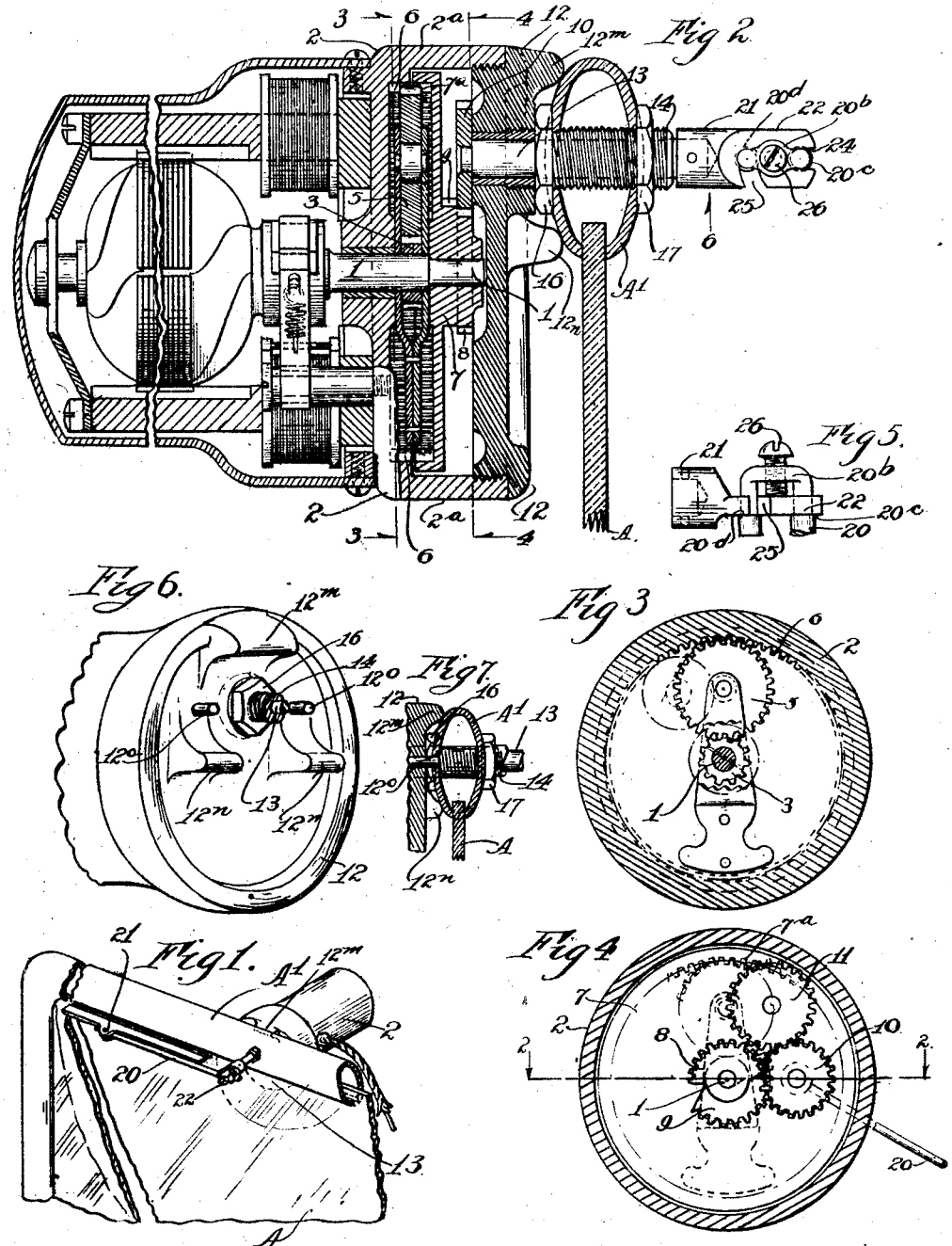

1,546,555

UNITED STATES PATENT OFFICE.

SIMON D. RYDSTEDT, OF CHICAGO, ILLINOIS, ASSIGNOR TO STEWART-WARNER SPEED-
OMETER CORPORATION, OF CHICAGO, ILLINOIS, A CORPORATION OF VIRGINIA.

MOTOR MECHANISM FOR WINDSHIELD WIPERS AND THE LIKE.

Application filed May 17, 1923. Serial No. 639,721.

*To all whom it may concern:*

Be it known that I, SIMON D. RYDSTEDT, a citizen of the United States, residing in the city of Chicago, in the county of Cook and the State of Illinois, have invented certain new and useful Improvements in Motor Mechanism for Windshield Wipers and the like, of which the following is a specification, reference being had to the accompanying drawings, forming a part thereof.

The purpose of this invention is to provide an improved motor mechanism adapted for such purposes as operating a wind-shield wiper or other device requiring oscillatory movement of its functioning members; a specific purpose of the invention being to render the motor mechanism so compact and of such form that it may be securely and effectively mounted on such slender support as the frame of the wind-shield, and adapted when so mounted, for actuating the functioning member positioned at the opposite side from the motor mechanism of the part upon which the latter is mounted. It consists in the elements and features of construction shown and described as indicated in the claims.

In the drawings:—

Figure 1 is a perspective view of a portion of the wind-shield of the motor vehicle having a wind-shield wiper actuated by a motor mechanism embodying this invention shown as to its casing mounted in operative position on the wind-shield frame.

Figure 2 is a section axial in respect to the motor mechanism.

Figure 3 is a section at the line 3—3 on Figure 2.

Figure 4 is the section at the line 4—4 on Figure 2.

Figure 5 is a detailed plan view of a fastening for holding the wiper arm.

Figure 6 is a perspective view of the motor casing from the forward side.

Figure 7 is a detail section through the wind-shield frame bar at the point of mounting and securement of the motor thereon.

In the structure shown in the drawings a wind-shield is shown at A with the upper bar of its frame $A^1$ having mounted upon it the motor mechanism embodying this invention. The motor mechanism comprises an electric motor which is shown conventionally having its rotor shaft, 1, protruding from the motor frame, 2, and carrying at the outer side of the frame through which the shaft protrudes, a pinion, 3, fast on the shaft and carrying also loose on the shaft a planetary gear carrier, 4, which is bifurcated having its two fork arms journaled on the rotor shaft on opposite sides of the pinion, 3, fixed thereon and carrying between its fork arms a planetary gear, 5, meshing with the pinion, 3. The motor frame plate 2 is extended in an annular flange, $2^a$, which forms a casing encompassing the rotor shaft and the gear mechanism associated therewith, said gear mechanism comprising an internal gear, 6, which may be, as shown, cut in the casing, $2^a$, so as to be integral therewith. Loose on the rotor shaft, 1, there is a second internal gear, 7, whose toothed annulus, $7^a$, is of the same diameter as the internal gear, 6, said internal gears, however, being differentially toothed, the gear annulus, $7^a$, having, for example, one more tooth than the gear 6, both of said gears meshing with the planetary gear 5, with the result, as will be readily understood, that the internal gear $7^a$, derives from the rotor shaft with which it is co-axial, rotary speed reduced from 100 to 1. The internal gear 7 carries two segment gears, 8 and 9, concentric with the annular gear and rotor shaft, desirably formed integrally with the internal gear, 7, as shown. These gear segments are of different radius and offset from each other along the axis, for meshing respectively with two intermeshing gears, 10 and 11, which are mounted and journaled on the frame or casing, the means for so mounting them being afforded by a cap, 12, which is screwed into the annular casing flange, $2^a$, closing what would otherwise be a lateral opening into said casing. The two gear segments, 8 and 9, are relatively positioned as to their angular extent about the axis for engaging consecutively and alternatively with the gears, 10 and 11, which they respectively actuate; so that as the internal gear 7 rotates continuously in the same direction, the segment gear 9 meshing with the gear 11, through 180 degrees of a revolution runs out of mesh with said gear 10 simultaneously with the entering into mesh of the segment 8 with the gear 10; and said segment gear 8 runs out of mesh with the gear 10 simultaneously with the reentering into mesh of the segment 9 with the gear 11. The result, it will be understood, as to the gears 10 and 11, is that they are oscillated about their respective axes, each being rotated thru 180 degrees, or such fraction of an entire revolution as the number of teeth on the actuated segment is of the number of teeth on the gear, which is driven thereby.

When this motor mechanism is to be employed for such purpose as operating the wiper member of a wind-shield cleaner which for its function has desirably an oscillating movement, the gear 10 is provided with a shaft 13, which extends through the casing cover 12, a journal bearing bushing, 14, being provided for it screwed into the casing cap, 12, and protruding therefrom a sufficient length to protrude through the thickness of the frame bar, 8, of the wind-shield and therebeyond far enough to receive suitable clamping nuts, 16 and 17, outside and inside respectively of the said frame bar; the shaft 13, is made of such length as to extend entirely through said journal bushing and therebeyond at the outer side of the wind-shield for having attached to it the wiper arm, 20, carrying the wiper bar, 21, which is oscillated thru 180 degrees over the wind-shield. The means employed for securing the wiper arm to the outer end of the shaft is made detachable from the shaft so as not to interfere with inserting the shaft through the journal bushing and it is also desirably made so that the wiper arm may be readily detached and attached from the detachable terminal of the shaft. Construction for this purpose is seen in Fig. 6 consisting of a collar, 21, adapted to be applied to the protruding end of the shaft, 13, and having a projecting lug, 22, provided with two notches, 24 and 25, in its end and one side respectively, for receiving the two sides of the hook-loop, $20^b$, with which the wiper arm is terminated, said wiper arm having shoulders, $20^c$ and $20^d$, at the commencement of the loop and at the hook end thereof, which stop against the under side of the lug, 22, when the loop having been entered in the notch, 24, is swung around and into notch 25, and a screw, 26, set through the head of the loop being screwed down upon the upper side of the lug, 23, as seen in Fig. 6, clamps the shoulders $20^c$ and $20^d$ against the lug at the underside.

For completing the securement of the motor casing to the frame of the windshield, the casing cap, 12, has exteriorly projecting bosses, $12^m$ and $12^n$, which are spaced apart and shaped at their ends for seating upon and engaging between them the top bar, $A^1$, of the windshield of the usual curvilinear form in cross section, such engagement serving to fix the motor casing against turning of the same around the axis of the threaded bushing, 13, which serves as the main securement of the casing to the windshield frame. And to adapt the casing for securement to a windshield frame bar which may be narrower than the fixed interval between the lugs, $12^m$ and $12^n$, the cap, 12, is provided with dowel projections, $12^p$, $12^p$, for which holes may be bored in the windshield frame bar.

I claim:—

1. In combination with a rotor shaft of a motor and a pinion thereon, a planetary gear carrier on said shaft; a planetary gear carried thereby meshing with said pinion; an internal gear fixed with respect to the motor frame; a second internal gear loose on the rotor shaft; said two internal gears being differentially toothed, the planetary gear being meshed with both of them; two segment gears carried by the second internal gear; two intermeshing gears mounted in the frame for engagement by the two segment gears respectively, the segment gears being positioned as to their angular extent about the shaft axis for alternate engagement with said two intermeshing gears respectively; whereby oscillatory rotation of the intermeshing gears is derived from the continuous rotation of the rotor shaft.

2. In the construction defined in claim 1, foregoing, a planetary gear carrier being a bifurcated member having its two fork arms journaled on the rotor shaft on opposite sides of the pinion fixed thereon, and carrying the planetary gear also between said fork arms.

3. In the construction defined in claim 1, foregoing, the motor frame comprising a casing flange encompassing the internal gears and forming a laterally open chamber therefor; a cap for closing said lateral opening, the two intermeshing gears being journaled on said cap.

In testimony whereof, I have hereunto set my hand at Chicago, Illinois, this 7th day of May, 1923.

SIMON D. RYDSTEDT.